June 24, 1958  KARL-HEINZ PAULI  2,839,924
OUTSIDE THERMOMETER PARTICULARLY FOR MOTOR VEHICLES
Filed Dec. 13, 1955

INVENTOR

Karl-Heinz Pauli

United States Patent Office 2,839,924
Patented June 24, 1958

2,839,924

OUTSIDE THERMOMETER PARTICULARLY FOR MOTOR VEHICLES

Karl-Heinz Pauli, Preetz, Holstein, Germany

Application December 13, 1955, Serial No. 552,930

Claims priority, application Germany January 5, 1955

5 Claims. (Cl. 73—349)

The present invention relates to outside thermometers, and is particularly directed to a special type of bimetal thermometer to be arranged at the side-windows of motor vehicles, and whose bimetal element (a spiral spring of bimetal) is, on the one hand, sufficiently protected against dust and moisture, and, on the other hand, satisfactorily circumflowed by the driving wind, so that it quickly reacts to the temperature of the country passed through by the vehicle.

According to the invention this is achieved by the arrangement of the bimetal element in a main chamber positioned behind two anti-chambers, each of which is provided with an opening or passage extending in opposite directions and connecting the anti-chambers with the open air, and that, furthermore, each of the anti-chambers is in communication with the main-chamber by an opening or passage extending in a direction perpendicular to the direction of said openings or passages leading into the open air. Preferably, each of the two anti-chambers is further provided with an additional downwardly extending opening or passage for the flow of sprinkling water out of the anti-chambers.

The aforesaid two oppositely extending passages, of which one is positioned in the driving direction of the vehicle, produce the result that a constant passage of the driving wind through the main chamber, and consequently also a constant circumflowing of the bimetal element in the main chamber by the outside air, is thereby automatically guaranteed. At the moving of the vehicle this passage of the driving wind through the main chamber is, therefore, reliably ensured.

When the vehicle is in motion, the outside air, passing along the sides of the vehicle, enters the thermometer through the passage, which of the two oppositely extending passages of the anti-chambers is positioned at the forward end in the driving direction of the vehicle. After entering the passage the air hits against the back-wall of the anti-chamber and then flows off practically entirely in the direction of the passage leading into the main chamber, while only a small portion of the air is branched off and escapes from the anti-chamber through the passage for the sprinkling water, guaranteeing in this way a quick and complete outflow of the air from the anti-chamber. In the anti-chamber positioned toward the rear (in the driving direction of the vehicle) a partial vacuum is simultaneously produced by the air-current. The latter anti-chamber is likewise connected with the main chamber by a passage. Hence, overpressure in the anti-chamber at the entering end and pressure below normal in the other anti-chamber guarantee a quick passage of the air through the main chamber positioned between the two anti-chambers.

Consequently, as the bimetal element is constantly directly circumflowed by the air current, a quick and precise indication of the outside temperature is reliably vouchsafed, although at times the outer casing may be cooled down slightly below the outside temperature owing to evaporation or the like.

The arrangement of the inlet passages of the anti-chambers and of the passages to or from the main chamber in different directions, as well as the arrangement of these passages at different positions of elevation, and also the provision of the bar altering the direction of flow of the sprinkling water, cause a multiple change of direction of the air-current, so that dust and sprinkling water are deposited by the baffling effect at the walls of the anti-chambers, from where they are discharged through the aforesaid passages for the outflow of the sprinkling water.

It may happen that in the main chamber momentarily a suction effect and partial vacuum are produced, owing to whirling movements of the air before the air passages of the anti-chambers. This may occasionally occur when the vehicle is at rest, but will never last for a long time. In a case like this the main chamber may momentarily "breathe" like a lung. But also when this happens the entering of dust or water into the main chamber is reliably prevented by the aforedescribed arrangement of the entering passages of the anti-chambers and of the main chamber and by the aforesaid provision of the bar altering the direction of flow of the sprinkling water.

Additional features and advantages of the invention will be understood from a consideration of the following detailed description taken in connection with the accompanying drawings, forming a part of this specification and in which an embodiment of the invention has been shown by way of example.

In the drawings, in which like parts are referred to by the same reference characters in all of the several figures, Fig. 1 is a top plan view of the thermometer, as seen by a spectator located outside the vehicle, with the outer casing consisting entirely of transparent material;

Figure 1:
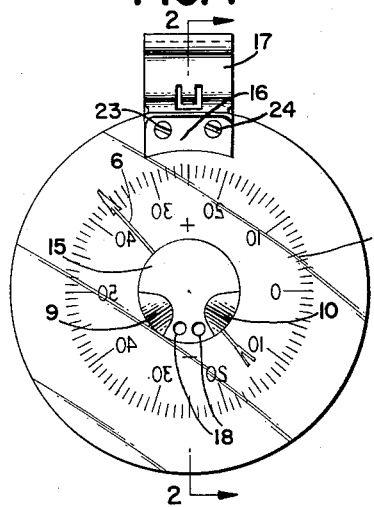
Figure 3:
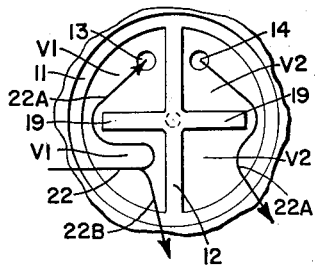
Fig. 3 is a top plan view of the anti-chambers after removal of the anti-chamber-cover.
Figure 2:
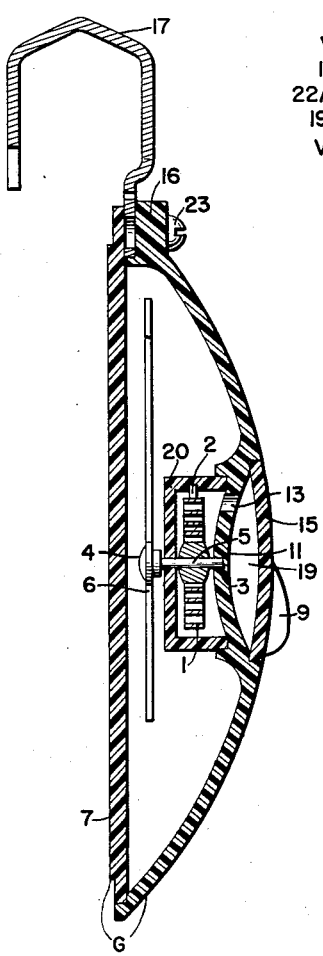
Fig. 2 is a vertical cross-section on line II—II of Fig. 1.
Figure 5:
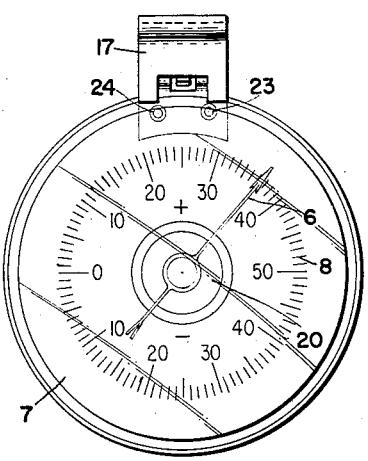
Fig. 5 is a top plan view of the thermometer, as seen by the operator of the vehicle from the interior of the car.
Figure 4:
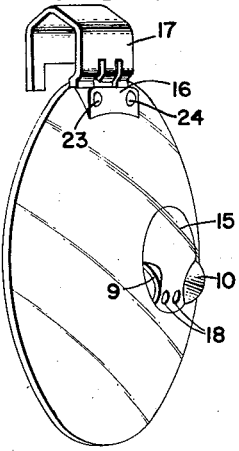
Fig. 4 is a perspective view of the thermometer seen from the outside of the vehicle.

Referring now to the drawings in detail, the reference numeral 1 designates a spiral spring of bimetal having its outer end 2 fastened to a wall of the main-chamber casing 20, while its inner end is secured to the rotatable shaft 5. The shaft 5 is journalled at 3 and 4 and carries at its end projecting from the main-chamber casing 20 the temperature indicator 6. G is the outer casing surrounding the entire thermometer, and 7 is a transparent wall of the outer casing G. Provided on the transparent wall 7 is the thermometer scale 8 behind which the indicator 6 operates. V1 and V2 are the two anti-chambers covered up by the anti-chamber-cover 15, which by means of two outwardly bulging cover portions or passages 9 and 10 connects each of the two anti-chambers with the open air. The bottom 11 of the two anti-chambers separates the anti-chambers from the main chamber 20, while the two anti-chambers are separated from each other by the partition wall 12. 13 and 14 are two perforations or passages leading from the anti-chambers V1 and V2 into the main chamber H. 16 is a projecting portion provided at the outer casing G for the fastening thereto of a supporting element 17 (a clip or the like), which supporting element may be secured to the casing G with the aid of screws 23 and 24. 18 are the outflow holes for the sprinkling water, which outflow holes form in the anti-chamber cover 15 for each of the anti-chambers a downwardly extending passage. These two holes in the anti-chamber-cover 15 are separated from each other by the partition wall 12. 19 is a rib or bar altering the direction of flow of the sprinkling water. The bar 19 prevents the sprinkling water entering the anti-chamber with great force from passing along the partition 12 in upward direction to the passages 13 and 14. The main chamber casing 20 is provided with a perforation 4 for the extension therethrough of the rotatable shaft 5. Supposing the driving wind blows in the direction indicated by the straight-lined arrow 21, then the air current enters the anti-chamber V1 through the passage or opening 9 and is then subdivided within the anti-chamber V1 into the air currents indicated by the arrows 22A and 22B. Because of the baffling effect produced by the bar 19 the air current portion 22A is deflected in rearward and upward direction and then passes through the perforation or passage 13 into the main chamber H, leaves the main chamber through the passage 14, passes through the anti-chamber V2, and from there via the passage 10 into the open air. The other air current portion 22B leaves the anti-chamber V1 directly through the outflow hole 18 for the sprinkling water, whereby dust and water are carried along by it.

As already mentioned, the wall portion 7 of the outer casing G is transparent. It is, however, advisable to produce the entire outer casing G and, under certain circumstances, also the walls of the main chamber 20 and of the anti-chambers V1 and V2 from transparent material, so that the spiral spring of bimetal and its shaft as well as the temperature indicator 6 are visible from the outside, and that the thermometer as a whole is clearly discernible, and that the satisfactory illumination of the interior of the vehicle is not interfered with by the arrangement of the thermometer at the window. However, I wish to say that the invention is not confined to any strict conformity with the showing of the drawings, but may be changed or modified, so long as such changes or modifications make no material departure from the salient features of the invention as expressed in the appending claims.

What I claim as new and desire to secure by Letters Patent of the United States is:

1. An outside thermometer, particularly for use at motor vehicles, comprising, an outer casing provided with a transparent front wall, a rear wall and with a graduated scale on said transparent front wall; means forming a main chamber positioned within said outer casing; a shaft rotatably journalled in opposite walls of said main chamber and having one of its ends project therefrom into said outer casing behind said transparent front wall; a spiral spring of bimetal mounted upon said rotatable shaft within said main chamber and having one of its ends secured to a wall of said main chamber and its other end to said rotatable shaft; said rear wall of said outer casing having a recessed portion superposed over said main chamber and forming one wall of said main chamber; a cover mounted over said recessed portion forming a pair of antichambers of equal size; said antichambers being separated by a vertically extending partition located between said cover and said recessed portion of said rear wall; said recessed portion of said rear wall having passages therein located in the proximity of the upper end of said vertical partition providing communication between said main chamber and said antichambers, said cover being provided with a pair of outwardly bulging portions positioned on either side of the lower end of said vertically extending partition and forming passages directed toward the outside in opposite directions, said cover being further provided on either side of said partition between said pair of bulging portions with a passage leading to the outside; and a temperature indicator mounted on said projecting end of said rotatable shaft within said outer casing behind said transparent front wall provided with said graduated scale.

2. An outside thermometer as specified in claim 1, in which said pair of passages leading to the outside extend from said pair of anti-chambers through said cover in downward direction to the outside in such manner that sprinkling water entering said anti-chambers is enabled to flow out of said anti-chambers through said pair of downwardly extending passages.

3. An outside thermometer as specified in claim 1, in which said pair of passages connecting said pair of antichambers with said main chamber extend into said main chamber in a direction vertical to the direction in which said pair of passages formed by said pair of bulging portions extend toward the outside.

4. An outside thermometer as specified in claim 1, including a bar-like blocking wall extending through a substantial portion of said pair of anti-chambers on both sides of said vertically extending partition and transversely thereto below said pair of passages connecting the anti-chambers with the main chamber, said blocking wall being adapted to prevent sprinkling water entering said anti-chamber from passing into said passages connecting said anti-chambers with said main chamber.

5. An outside thermometer as specified in claim 1, in which said main chamber is of cylindrical formation; and in which said pair of anti-chambers form semi-cylindrical extensions of said main chamber separated from said main chamber by said recessed portion of a rear wall of said outer casing.

References Cited in the file of this patent

UNITED STATES PATENTS 2,371,603     Bradley               Mar. 20, 1945